(12) United States Patent
Kisner et al.

(10) Patent No.: US 10,284,021 B2
(45) Date of Patent: May 7, 2019

(54) LIGHTING SYSTEM WITH INDUCTION POWER SUPPLY

(71) Applicant: UT-Battelle, LLC, Oak Ridge, TN (US)

(72) Inventors: Roger A. Kisner, Knoxville, TN (US); Christi R. Johnson, Kingston, TN (US); Frederick K. Reed, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 16/103,324

(22) Filed: Aug. 14, 2018

(65) Prior Publication Data
US 2019/0052125 A1 Feb. 14, 2019

Related U.S. Application Data

(60) Provisional application No. 62/545,107, filed on Aug. 14, 2017.

(51) Int. Cl.
*H05B 33/08* (2006.01)
*H05B 6/10* (2006.01)
(Continued)

(52) U.S. Cl.
CPC ............... *H02J 50/30* (2016.02); *H05B 6/06* (2013.01); *H05B 6/10* (2013.01); *H05B 33/0815* (2013.01);
(Continued)

(58) Field of Classification Search
CPC .. H02J 50/30; H05B 6/06; H05B 6/10; H05B 33/08; H05B 33/0815; H05B 33/0854;
(Continued)

(56) References Cited

U.S. PATENT DOCUMENTS 2,783,384 A 2/1957 Bright et al.
3,107,152 A 10/1963 Ford et al.
(Continued)

FOREIGN PATENT DOCUMENTS

| CN | 102494315 A | 6/2012 |
| CN | 202719427 U | 2/2013 |
| WO | 2013/099759 A1 | 7/2013 |

OTHER PUBLICATIONS

Markus, J., "Guidebook of Electronic Circuits", 1974, p. 952.
(Continued)

*Primary Examiner* — Jimmy T Vu
(74) *Attorney, Agent, or Firm* — Scully, Scott, Murphy & Presser, P.C.

(57) ABSTRACT

A system for producing light is provided. The system comprises a sealed enclosure surrounding a porous graphite foam conductor which is exposed to an electromagnetic field generated by an oscillating circuit. When exposed, the foam conductor conducts induced electric current which heats the same to product light. The amount of light is controllable by changing the output of a drive circuit. The oscillating circuit comprises a first inductor and a first capacitor. The first inductor has a first terminal and a second terminal. The output of the drive circuit is controlled by turning a MOSFET OFF and ON. The MOSFET is turned ON when an integrated signal representative of a difference between a voltage proportional to the first terminal and a voltage proportional to the second terminal is between a first voltage threshold and a second voltage threshold and based on a timing signal.

20 Claims, 16 Drawing Sheets

(51) Int. Cl.
*H02J 50/30* (2016.01)
*H05B 37/02* (2006.01)
*H05B 6/06* (2006.01)

(52) U.S. Cl.
CPC ..... *H05B 33/0854* (2013.01); *H05B 37/0218* (2013.01); *H05B 37/0281* (2013.01)

(58) Field of Classification Search
CPC . H05B 37/02; H05B 37/0218; H05B 37/0281
USPC ........ 315/149–158, 200 R, 209 R, 291, 307, 315/308
See application file for complete search history.

(56) References Cited

U.S. PATENT DOCUMENTS

| | | | |
|---|---|---|---|
| 3,116,392 | A | 12/1963 | Morey |
| 3,411,123 | A | 11/1968 | Kydd |
| 3,980,496 | A | 9/1976 | Ludwig et al. |
| 4,309,586 | A | 1/1982 | Ishibashi |
| 4,327,268 | A | 4/1982 | Frank |
| 4,757,177 | A | 7/1988 | Suzuki et al. |
| 4,803,370 | A | 2/1989 | Eckles |
| 4,888,461 | A | 12/1989 | Takano et al. |
| 4,894,562 | A | 1/1990 | Cavaliere et al. |
| 4,900,885 | A | 2/1990 | Inumada |
| 4,959,557 | A | 9/1990 | Miller |
| 5,061,835 | A | 10/1991 | Iguchi |
| 5,140,118 | A | 8/1992 | Catanese et al. |
| 5,329,100 | A | 7/1994 | Lee |
| 5,481,091 | A | 1/1996 | Grimm et al. |
| 5,504,309 | A | 4/1996 | Geissler |
| 5,536,920 | A | 7/1996 | Kwon |
| 6,025,739 | A | 2/2000 | Campbell et al. |
| 6,033,506 | A | 3/2000 | Klett |
| 6,037,032 | A | 3/2000 | Klett et al. |
| 6,217,800 | B1 | 4/2001 | Hayward |
| 6,261,485 | B1 | 7/2001 | Klett |
| 6,387,343 | B1 | 2/2002 | Klett |
| 6,398,994 | B1 | 3/2002 | Klett |
| 6,344,159 | B1 | 6/2002 | Klett |
| 6,430,935 | B1 | 8/2002 | Klett et al. |
| 6,491,891 | B1 | 12/2002 | Klett et al. |
| 6,654,549 | B1 | 11/2003 | Konishi |
| 6,673,328 | B1 | 1/2004 | Klett |
| 6,729,269 | B2 | 5/2004 | Ott et al. |
| 6,763,671 | B1 | 7/2004 | Klett et al. |
| 6,780,505 | B1 | 8/2004 | Klett et al. |
| 6,809,304 | B2 | 10/2004 | Besmann et al. |
| 7,018,093 | B2 | 3/2006 | Park et al. |
| 7,070,755 | B2 | 7/2006 | Klett et al. |
| 7,147,214 | B2 | 12/2006 | Klett et al. |
| 7,258,836 | B2 | 8/2007 | Hill et al. |
| 7,670,682 | B2 | 3/2010 | Klett et al. |
| 8,133,826 | B2 | 3/2012 | Klett et al. |
| 8,350,198 | B2 | 1/2013 | Belsh et al. |
| 9,017,598 | B2 | 4/2015 | Menchhofer et al. |
| 9,080,818 | B2 | 7/2015 | Maurer et al. |
| 9,083,062 | B2 | 7/2015 | Kumar et al. |
| 9,464,847 | B2 | 10/2016 | Maurer et al. |
| 9,528,785 | B2 | 12/2016 | Klett et al. |
| 9,723,659 | B2 * | 8/2017 | Makosinski ............ H01L 35/30 |
| 9,739,501 | B2 | 8/2017 | Klett et al. |
| 9,906,078 | B2 | 2/2018 | Klett et al. |
| 2003/0115753 | A1 | 6/2003 | Klett et al. |
| 2003/0162007 | A1 | 8/2003 | Klett et al. |
| 2005/0095168 | A1 | 5/2005 | Centanni et al. |
| 2009/0049871 | A1 | 2/2009 | Klett et al. |
| 2009/0087373 | A1 | 4/2009 | Klett et al. |
| 2010/0051607 | A1 | 3/2010 | Yang et al. |
| 2010/0186422 | A1 | 7/2010 | Yang et al. |
| 2012/0049239 | A1 | 3/2012 | Sung |
| 2012/0107555 | A1 | 5/2012 | Miller et al. |
| 2012/0183116 | A1 | 7/2012 | Hollenbach et al. |
| 2012/0199330 | A1 | 8/2012 | Maurer et al. |
| 2012/0199331 | A1 | 8/2012 | Maurer et al. |
| 2012/0199334 | A1 | 8/2012 | Maurer et al. |
| 2012/0255718 | A1 | 10/2012 | Klett et al. |
| 2014/0017159 | A1 | 1/2014 | Hsiao |
| 2014/0291690 | A1 | 10/2014 | Yi et al. |
| 2016/0057814 | A1 | 2/2016 | Klett et al. |

OTHER PUBLICATIONS www.ambrell.com/PDFo/411-0169-10.pdf, "Ambrell Precision Induction heating".
International Search Report and The Written Opinion of the International Searching Authority dated Jan. 6, 2016 from International Application No. PCT/US15/45633.
Lin, W. et al., "Review on graphite foam as a thermal material for heat exchangers", Department of Energy Sciences, Lund University, Sweden. Energy End-Use Efficiency Issues (EEE), World Renewable Energy Congress, May 2011, pp. 748-755.
Drummond, K., "Thermal Characterization of Graphitic Foams for Use in Thermal Storage Applications", Department of Mechanical Engineering, Russ College of Engineering and Technology. Dec. 2012; pp. 1-105.
http://www.koppers.com/pages/kfoam, "Koppers, Kfoam Product Brochure" Jul. 20, 2014.
Klett, J. et al., "High-thermal-conductivity, mesophase-pitch-derived carbon foams: effect on precursor on structure and properties" Oak Ridge National Laboratory, Oak Ridge Tennesee, Carbon, vol. 38, Issue 7, 2000, pp. 953-973.
The International Search Report and The Written Opinion of the International Searching Authority dated Nov. 24, 2015 related International Application No. PCT/US15/45633.

* cited by examiner

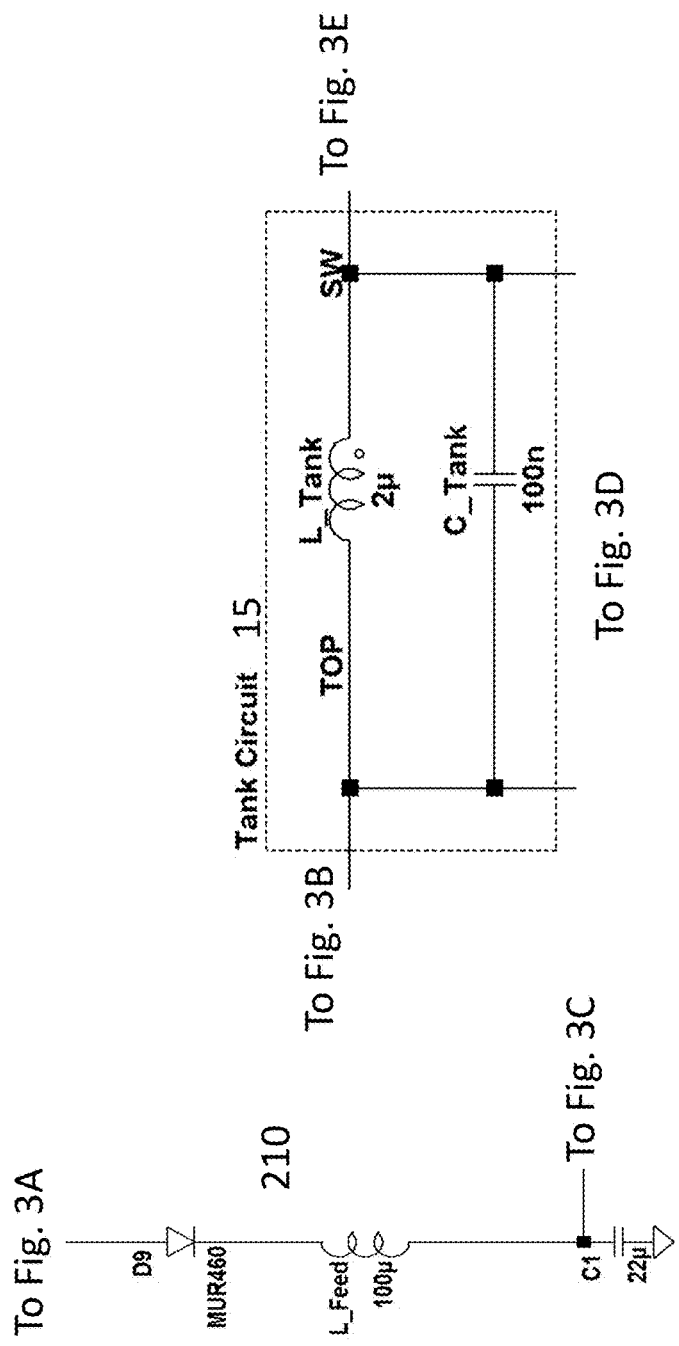

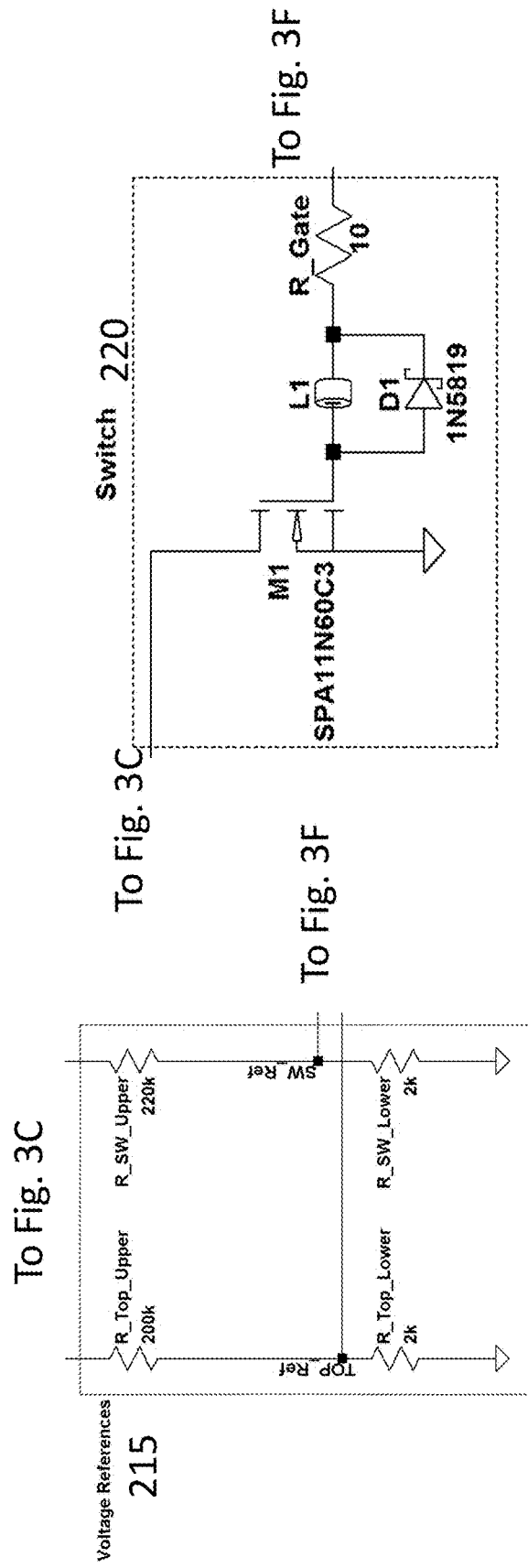

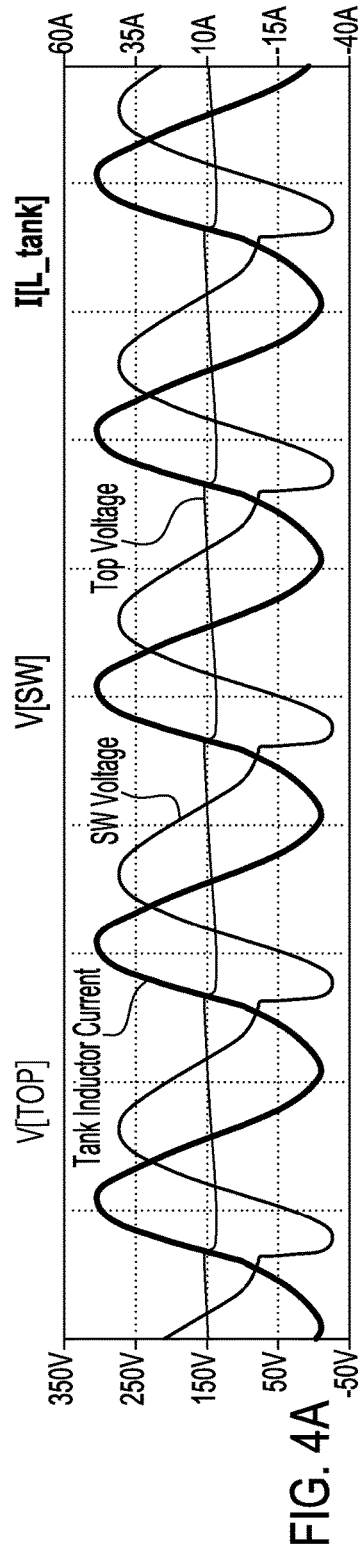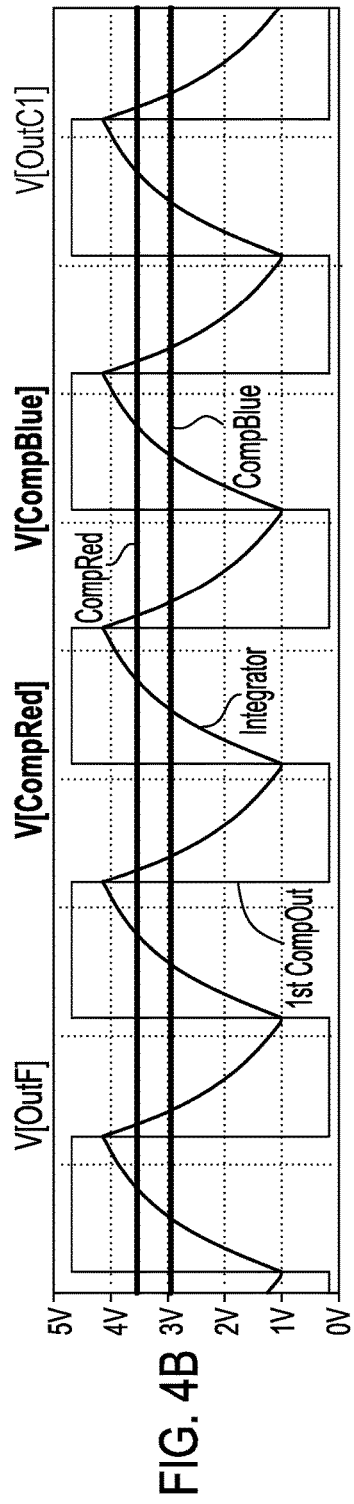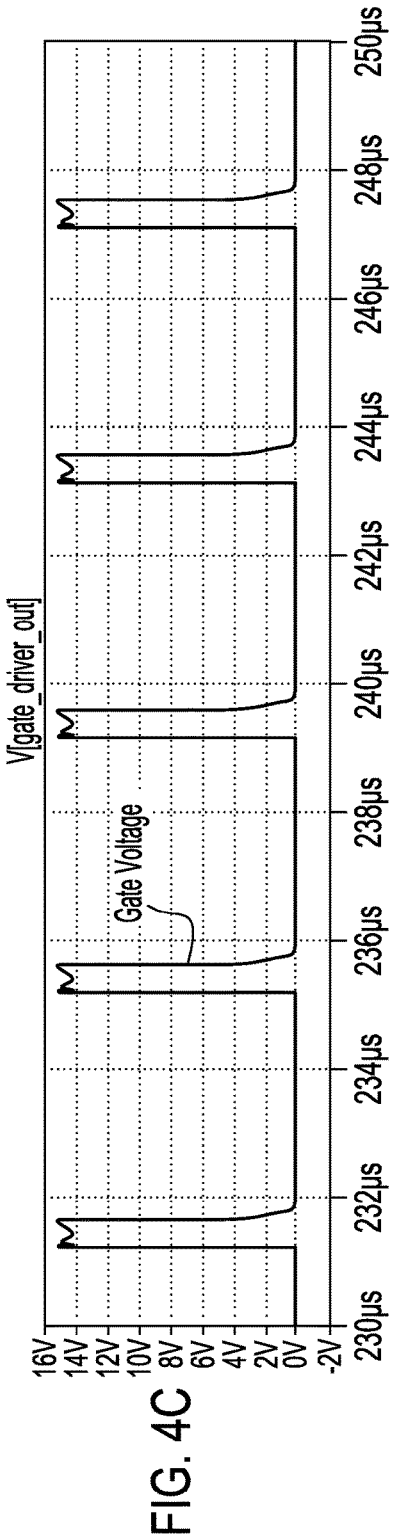

US 10,284,021 B2

LIGHTING SYSTEM WITH INDUCTION POWER SUPPLY

CROSS REFERENCE TO RELATED APPLICATION

The present application claims benefit of U.S. Provisional Application No. 62/545,107, filed on Aug. 14, 2017, all of the contents of which are incorporated herein by reference.

GOVERNMENT SUPPORT

This invention was made with government support under Prime Contract No. DE-AC05-00OR22725 awarded by the U.S. Department of Energy and pursuant to Work For Others Agreement No. NFE-14-05262. The government has certain rights in the invention.

FIELD OF THE DISCLOSURE

The present disclosure relates to lighting systems and inductive power transfer and more specifically the use of an inductive power supply to cause a porous graphite foam conductor to emit controllable light.

BACKGROUND

There is a push by the FAA to improve electrical efficiency at the nation's airports including lighting. The lights must be seen by both pilots and on-board cameras. Thus, the emitted light must include emission in the visual spectrum, e.g., 400 to 700 nm and as well, infrared spectrum such as, but not limited to 3 to 5 $\mu$m, which the cameras are sensitive to. Certain LEDS are capable of producing emission in the mid-infrared regions. However, these LEDs are expensive, low power, have relatively shortly lifetimes and do not generate enough heat to melt accumulated ice and snow in certain regions.

Alternatively, carbon foams may be used to emit light. U.S. Pat. No. 9,906,078 describes an example of certain carbon foams for emitting light. U.S. Pat. No. 9,906,078 is incorporated by reference.

SUMMARY

Accordingly, disclosed is a lighting system having an inductive power supply. The inductive power supply comprises an oscillating circuit and a drive circuit. The drive circuit may be operable directly from an input AC power supply and is configured to receive a wide variety of AC input voltages. Additionally, the drive circuit is configured to be used with various different oscillating inductors and operates over a range of resonant frequencies.

In an aspect of the disclosure, the system for producing light comprises a sealed enclosure having a porous graphite foam conductor, an oscillating circuit and a drive circuit. The sealed enclosure surrounds the porous graphite foam conductor. The oscillating circuit comprises a first inductor and a first capacitor. The first inductor has a first terminal and a second terminal. The oscillating circuit is configured to generate an electromagnetic field. The porous graphite foam conductor when exposed to the electromagnetic field conducts an induced electric current. The induced electric current heats the porous graphite foam conductor to produce light. The drive circuit is couplable to an AC power source and the oscillating circuit. The drive circuit is configured to regulate an amount of light produced by the porous graphite foam conductor. The drive circuit comprises a full wave rectifier and a MOSFET. The full wave rectifier is couplable to the AC power source and configured to convert AC power from the AC power source into DC power. The drain of the MOSFET is coupled to the second terminal of the first inductor. The source of the MOSFET is coupled to a ground. The gate of the MOSFET is coupled to a gate drive circuit. The MOSFET is turned on when an integrated signal representative of a difference of a voltage proportional to the first terminal and a voltage proportional to the second terminal is between a first voltage threshold and a second voltage threshold and based on a timing signal.

BRIEF DESCRIPTION OF THE DRAWINGS

FIG. 3B is a circuit diagram of a portion of the drive circuit including the decoupling and a capacitor;

FIG. 3C is a circuit diagram of an oscillating circuit;

FIG. 3D is a circuit diagram of a portion of the drive circuit including voltage references;

FIG. 3E is a circuit diagram of a portion of the drive circuit including a switch;

FIG. 3I is a circuit diagram of a porous graphite load model;

FIGS. 4A-4C depicts waveforms of the drive circuit, where FIG. 4A depicts the inductor current in the oscillating circuit, the Top Voltage (first terminal) and the SW voltage (second terminal), FIG. 4B depicts the voltage at the first comparator, a signal representative of an integrated difference between a voltage proportional to the first terminal and a voltage proportional to the second terminal and the two voltage thresholds, FIG. 4C depicts the gate voltage of the MOSFET;

DETAILED DESCRIPTION

Figure 1:
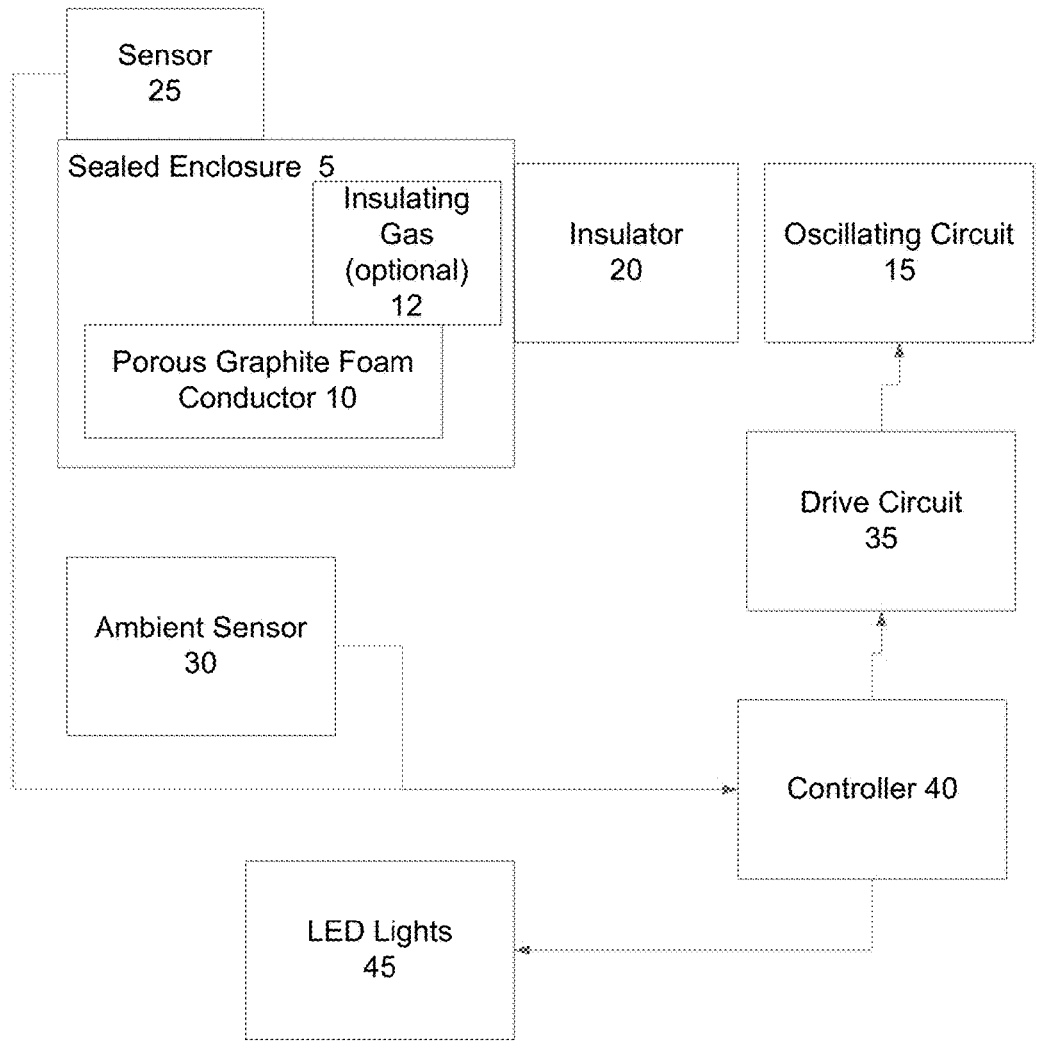
FIG. 1 is a block diagram of a lighting system in accordance with aspects of the disclosure.

FIG. 1 depicts a lighting system 1 according to aspects of the disclosure. The lighting system 1 comprises a porous graphite foam conductor 10 that can be mounted in any suitable manner. The porous graphite foam conductor 10 is in proximity to a source of a varying electromagnetic field (time varying) such as an oscillating circuit 15 (also referred to as tank circuit).

The porous graphite foam conductor 10 is sealed in a sealed enclosure 5. The sealed enclosure 5 protects the porous graphite foam conductor 10 from degradation due to rain, dust, oil or other chemical contact, such as combining with oxygen or mechanically derived damage such as dents and cracks. Additionally, the seal enclosure 5 may also permit the maintenance of desired gases or gas pressures/vacuum around the porous graphite foam conductor 10. Enclosure 5 may be shaped to lens the IR light to the proper angle of dispersion required to spread the light in a broad or narrow field of view. An insulating gas 12 may be optionally included in the sealed enclosure 5. The insulating gas may be a noble gas 12, such as argon, krypton and xenon which may have good thermal insulating performance.

The porous graphite foam conductor 10 when exposed to the electromagnetic field conducts an induced electric current, the electric current heating the porous graphite foam conductor 10 to produce light with a greater number of lumens than solid graphite can produce.

The manner in which the electromagnetic field is applied to the porous graphite foam conductor 10 may vary. The source (e.g., coil of the oscillating circuit 15) may be placed in such proximity to the porous graphite foam conductor 10 that the electromagnetic field sufficiently cuts through the foam to generate a sufficient induced current to satisfy the lighting requirements of the particular application. It has been found that an efficient arrangement for positioning the source (e.g., coil of the oscillating circuit 15) about the porous graphite foam conductor 10 is to wrap conductive coil(s) about the porous graphite foam conductor 10, and particularly about the sealed enclosure 5 that surrounds the foam without penetrating through the enclosure itself.

The inductor L_Tank (shown in FIG. 2) may be made of any suitable size, shape and material of conductor. In an aspect of the disclosure, a copper coil may be used for inductor L_Tank. Examples of the inductor L_Tank will be described later.

An insulator 20 may be provided to reduce heat losses from the porous graphite foam conductor 10. Any suitable shape, design or material for the insulator 20 is possible. In an aspect of the disclosure, the insulator 20 may be a PVC pipe. The PVC pipe does not heat because it is not an electrically conductive material. Thus, the induction field created by the inductor L_Tank passes freely through the PVC pipe without resulting in any electrical flow in the PVC material. The insulator 20 could be a carbon foam, rather than a graphite foam, as carbon foam is transparent to the AC field. In some embodiments, the inductor L_Tank may be wrapped around the insulator 20. Examples of arrangements of the inductor L_Tank, the sealed enclosure 5 and the insulator 20 will be described later.

In other aspects of the disclosure, the inductor L_Tank may be provided inside the sealed enclosure 5.

The system 1 also comprises a controller 40. The controller 40 turns the drive circuit 35 ON and OFF and may be used to adjust a timing signal and voltage thresholds to control the power supplied to the oscillating circuit 15. The controller 40 will be described later in detail.

The system 1 optionally may comprise a plurality of LED lights 45 that may be mounted to a circuit board (not shown) in proximity to the porous graphite foam conductor 10. The LED lights 45 or other visible light sources are used in some aircraft signaling applications, for example airport runways, and accordingly the combination of visible light and infrared detectable signals in a single package lighting structure may have many advantages over multiple separate lighting schemes.

In other aspects of the disclosure, the system 1 may comprises a cover (not shown). The cover may be provided to protect the lighting structure from chemical or mechanical damage, and to prevent fires should fuel or oil be dumped over the hot graphite foam conductor. The cover would be made from an IR transparent material such as high density polyethylene or a ceramic window material. Materials made from olefin monomers such as polyethylene, polypropylene, polymethylpentene, polybutene-1, among others are transparent to long wavelength radiation (7 to 14 micrometers) or to mid wavelength radiation (3 to 5 micrometers) depending on the desired range of wavelengths to be delivered. The cover may also impart a color to the light emitted from the structure, may focus or disperse the light as desired, or provide other useful benefits for the particular application. The cover may also define a lens such as a Fresnel lens to direct the light.

The system 1 further comprises a sensor 25 mounted on the sealed enclosure 5. In another aspect of the disclosure, the sensor 25 may be mounted near the sealed enclosure 5 instead of on the sealed enclosure 5. The sensor 25 may be a temperature sensor such as a RTD sensor. Other temperature sensors may be used such as a thermistor, thermopile, or thermocouple. The sensor 25 may be configured to detect the temperature of the porous graphite form conductor 10. The detected temperature may be used as a feedback to control the drive circuit 35, such as adjust the voltage thresholds and/or timing signal. In other aspects of the disclosure, the sensor 25 may be a light detector and detect the amount of light being emitted from the porous graphite foam conductor 10. In an aspect of the disclosure, the light detector may be a photodiode, a phototransitor or a photocell.

The system 1 further comprises an ambient sensor 30. The ambient sensor 30 may be a light sensor detecting the amount of light in the environment where the system 1 is deployed. Similar to the sensor 25, the detection may be used as a feedback to control the drive circuit 35.

Figure 2:
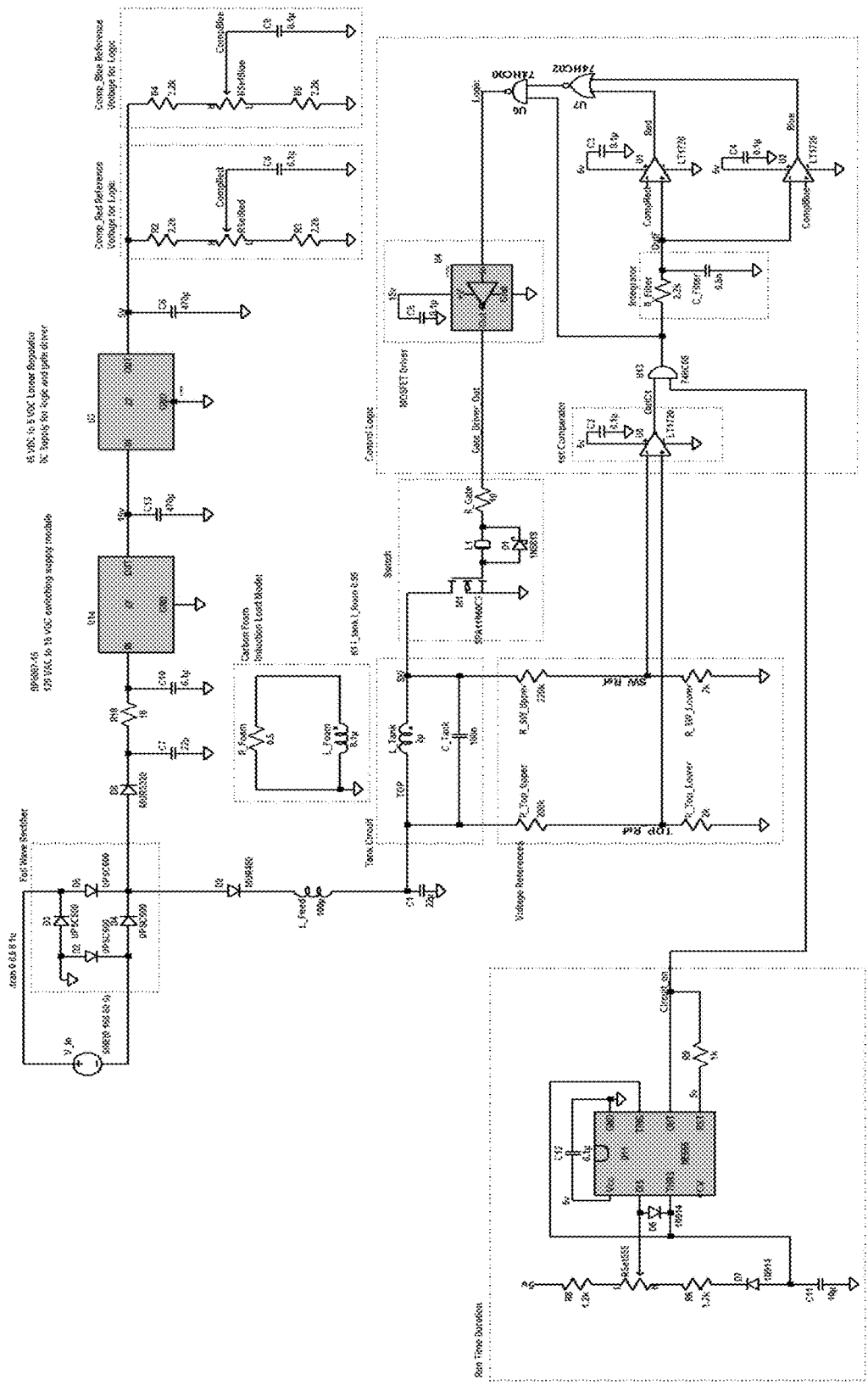
FIG. 2 is a circuit diagram of a drive circuit, an oscillating circuit and a porous graphite load model in accordance with aspects of the disclosure.
Figure 3A:
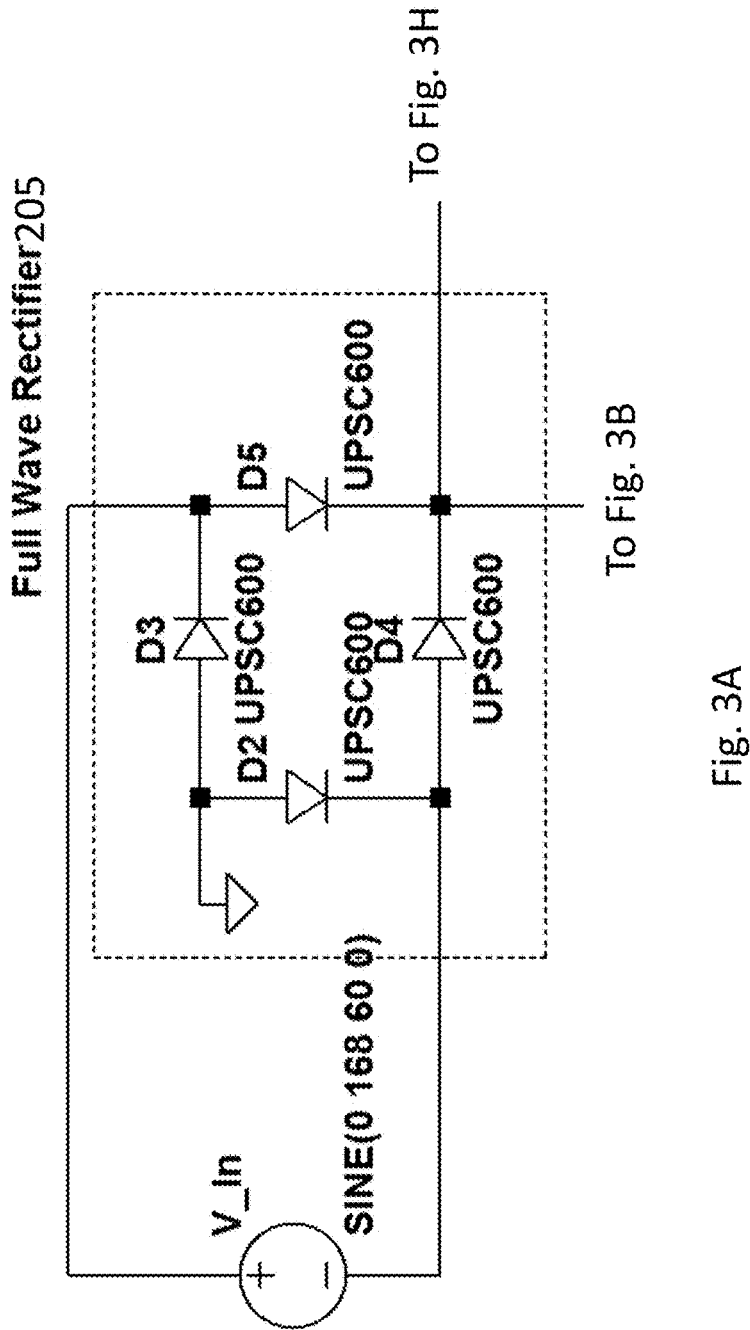
FIG. 3A is a circuit diagram of a portion of the drive circuit including an input source voltage and full wave rectifier.

The drive circuit 35 and oscillating circuit 15 (tank circuit) will now be explained in detail with respect to FIGS. 2 and 3A-3I. FIG. 2 depicts drive circuit 35 as a complete circuit. For purposes of further clarifying the description, portions of the drive circuit were divided into separate figures, e.g., FIGS. 3A, 3B, 3D, 3E, 3F, 3G and 3H. The oscillating circuit 15 (tank circuit) is also depicted in FIG. 3C and the porous graphite foam conductor 10 is modeled as carbon foam induction model 245 in FIG. 3I. The porous graphite foam conductor 10 is modeled as a resistor R_Foam and inductor L_Foam. In FIG. 3A-3I where the portions of the circuit depict connect with other portions of the circuit, the other portions are labeled.

As shown in FIGS. 2 and 3A, the drive circuit 35 comprises an input stage. The input stage include the input AC power V_in and a full wave rectifier 205. In the schematic, V_in is represented by a 168 Vpk sine wave (120 VAC RMS). 168 Vpk represents the peak amplitude of a 120 VAC RMS supply. A frequency of 60 Hz was used. The "tran" command above the circuit is a transient analysis command for the SPICE software. In an aspect of the disclosure, other input voltages may be used, such as 240 VAC. Advantageously, the drive circuit 35 works directly from the input voltage from the power line without requiring a step-down power transformer for a reduced size factor and cost.

The input voltage may be converted into DC by a full wave rectifier 205 as shown in FIG. 3A. The full wave rectifier 205 comprises four diodes D2-D5. D2-D5 are Schottky rectifiers. For example, Part No. UPSC600 may be used. The node after the full wave rectifier 205 is a hot chassis ground.

As shown in FIGS. 2 and 3B, the drive circuit 35 comprises decoupling 210. The decoupling 210 is connected to the full wave rectifier 205. In an aspect of the disclosure, the decoupling 210 may comprise a diode D9 connected in series with an inductor L_Feed. As depicted, L_Feed has an inductance of 100 µH. Diode D9 may be a switchmode power rectifier. For example, Part No. MUR460 may be used. A capacitor C1 is connected between ground and the inductor L_Feed. This capacitor C1 is also connected to a terminal of the oscillating circuit 15 (TOP) as shown in FIG. 2. One plate of the capacitor C1 is connected to TOP (first terminal) and one plate is connected to ground. The capacitor C1 prevents the voltage at the first terminal from going to ground at its low point. As depicted, the capacitor C1 has a capacitance of 22 µF.

Figure 3F:
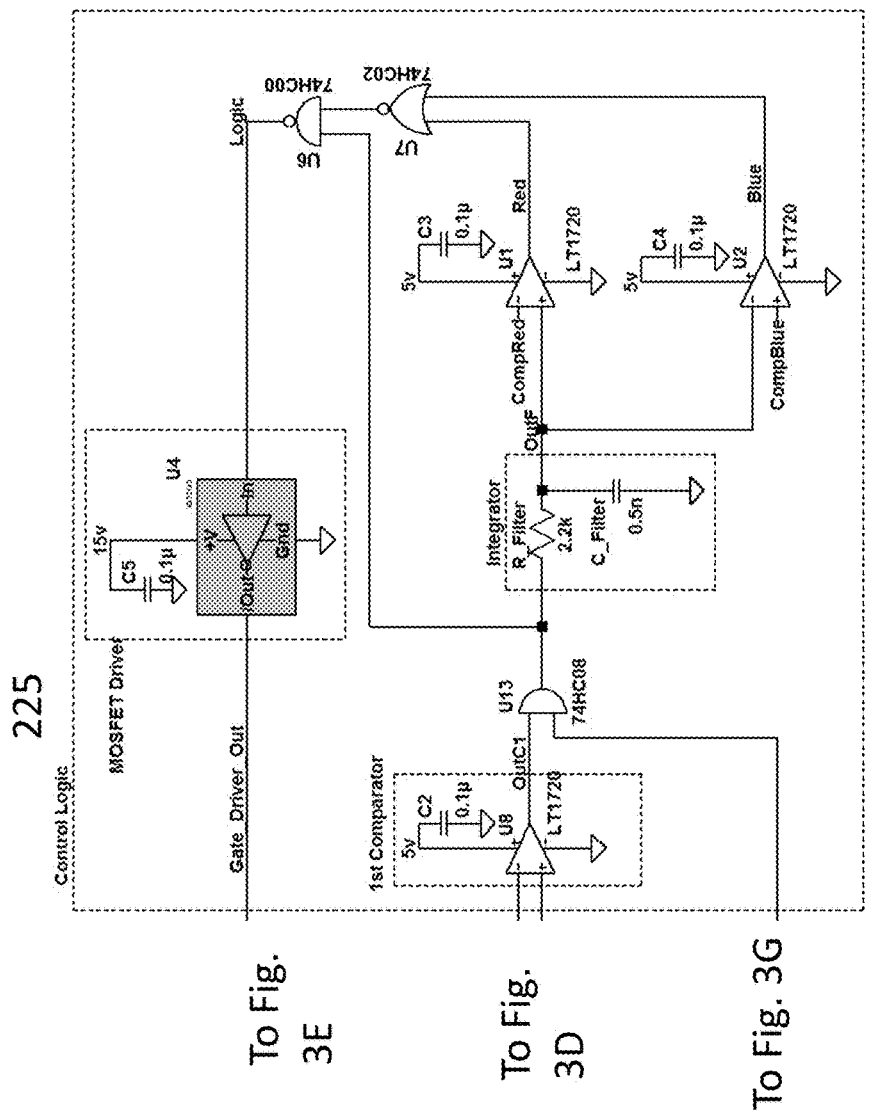
FIG. 3F is a circuit diagram of a portion of the drive circuit including control logic.
Figure 3G:
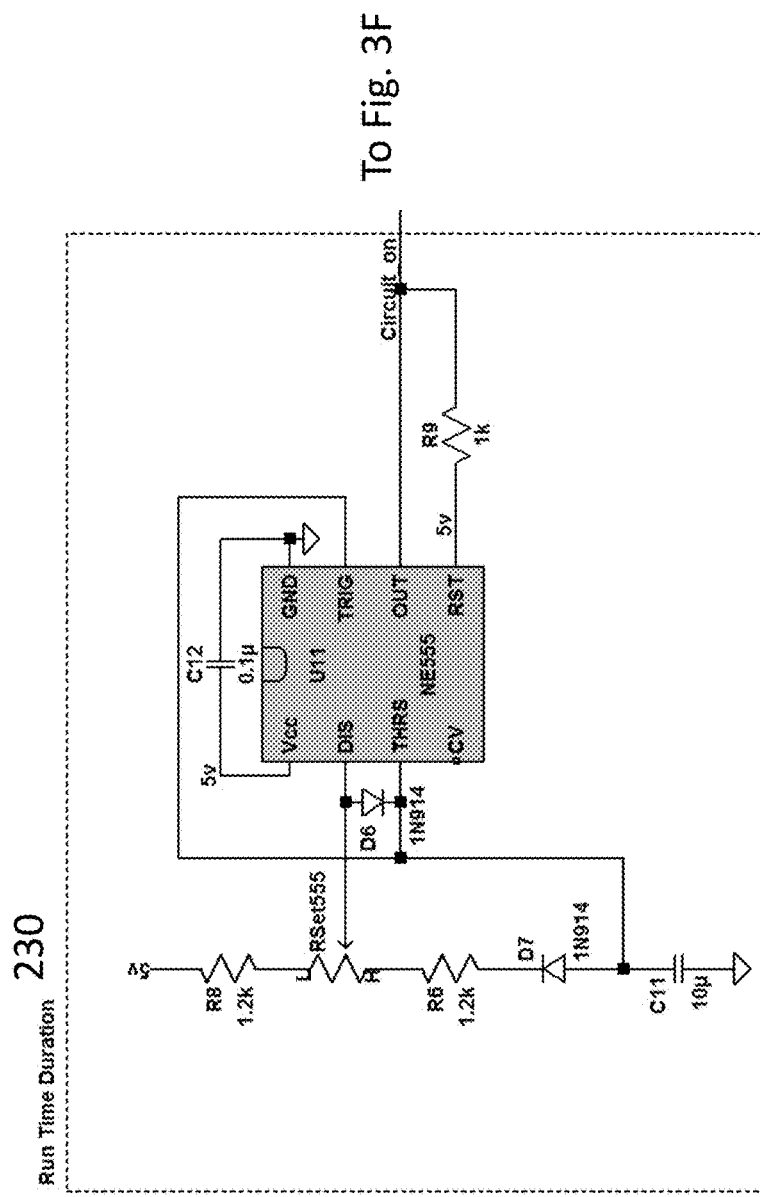
FIG. 3G is a circuit diagram of a portion of the drive circuit including a run time duration.
Figure 3H:
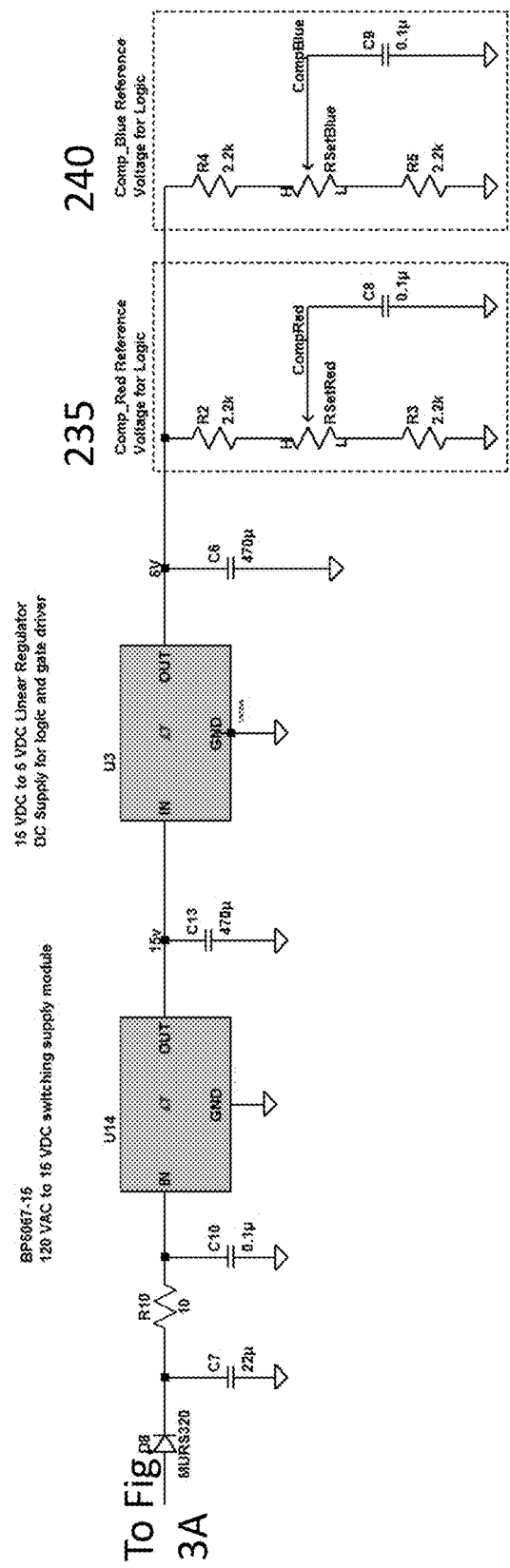
FIG. 3H is a circuit diagram of a portion of the drive circuit including threshold controls and linear regulators.
Figure 31:
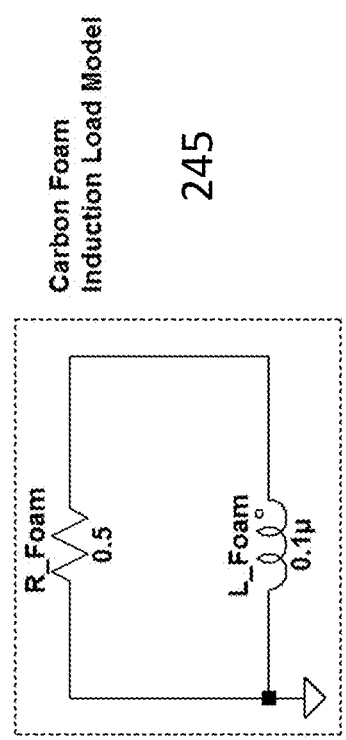

As shown in FIGS. 2 and 3H, the drive circuit 35 comprises a housekeep voltage generating portion and logic threshold generation portions 235 and 240. The housekeep voltage generating portion (also referred to as housekeeping circuit) generates the voltages used as power for other parts of the drive circuit. For example, 5V is used for the comparators U1/U2/U8 and the run time duration 230 and 15V is used for the gate driver U4. The housekeep voltage generating portion is connected to the full wave rectifier 205 and the logic threshold generation portions 235 and 240. The housekeeping voltage generating portion comprises a diode D8, a resistor R10 and pair of capacitors C7 and C10. The diode D8 is connected to the full wave rectifier 205 at one end and the resistor R10 and capacitor C7 at the other end. Capacitors C7 and C10 are connected at each end of the resistor R10. This portion of the housekeeping circuit filters the voltage supplied by the full wave rectifier 205. Diode D8 may be a surface mounted rectifier. For example, Part No. MURS320 may be used. As shown, resistor R10 has a resistance of 10Ω. C7 has a capacitance of 22 µF and C10 has a capacitance of 0.1 µF.

The housekeeping circuit further comprises two linear regulators U14 and U3 (DC-to-DC converter). Linear regulator U14 takes the voltage input into IN and converts it to 15V output. In other aspects of the disclosure, a switching supply module (switch mode device) may be used instead of linear regulator U14. For example, Part No. BP5067-15 as also identified in FIGS. 2 and 3H may be used. If, the BP5067-15 switching supply module is used an inductor may be added connecting to two of the pins of the module. Other switching supply modules may be used. The second linear regulator U3 takes 15V (input) and outputs 5V. Capacitors C13 and C6 are respectively connected to the 15V and the 5V and also to ground. For example, capacitors C13 and C6 may have a capacitance of 470 µF.

Each logic threshold generation portion (235 and 240) has the same topology. The portions comprise a resistive divider (voltage divider), a potentiometer and a capacitor. The logic threshold generation portion 235 generates CompRed, which is the higher voltage threshold and logic threshold generation portion 240 generates CompBlue, which is the lower voltage threshold. These voltage thresholds are used to determine when to turn a MOSFET M1 ON or OFF (and how long), as described later. The logic threshold generation portion 235 comprises resistors R2 and R3 and capacitor C8. As illustrated, resistors R2 and R3 have a resistance of 2.2 kΩ Capacitor C8 has a capacitance of 0.1 µF. The logic threshold generation portion 240 comprises resistors R4 and R5 and capacitor C9. As illustrated, resistors R4 and R5 have a resistance of 2.2 kΩ Capacitor C9 has a capacitance of 0.1 µF. Potentiometers RSetRed and RSetBlue have the same resistance range, but the set points are different. Rt=10K, however, the set point for CompRed is 0.65 whereas the set point for CompBlue is 0.55. The initial set points are only described for example and other initial set points may be used as required. Changing the set points controls the ON time of the MOSFET M1, which in turn controls the power supplied to the oscillating circuit 15. Therefore, the light emitted by the porous graphite foam conductor 10 is controlled by controlling the set points.

As shown in FIGS. 2 and 3D, the drive circuit 35 has voltage references 215 (also referred to as reference circuit 215). The reference circuit 215 is connected to the TOP (the first terminal) and SW (second terminal) of the oscillating circuit 15 (Tank Circuit). The reference circuit 215 is designed to get reference voltages proportional to the voltages on the TOP (first terminal) and SW (second terminal) respectively and supply the same to the control logic 225. These voltages are TOP_Ref and SW_Ref. TOP_Ref is proportional to the voltage at TOP (first terminal) and SW_Ref is proportional to the voltage at SW (second terminal). The proportion is based on the resistive divider (voltage divider). Resistors R_Top_Upper and R_Top_Lower form the resistive divider for TOP (first terminal) and resistors R_SW_Upper and R_SW_Lower form the resistive divider for SW (second terminal). The resistors R_Top_Upper and R_SW_Upper have different values to ensure that the oscillation starts. As illustrated, resistor R_Top_Upper has a resistance of 200 kΩ and resistor R_SW_Upper has a resistance of 220 kΩ Also as illustrated, resistors R_Top_Lower and R_SW_Lower have a resistance of 2 kΩ.

As shown in FIGS. 2 and 3F, the drive circuit 35 has control logic 225. The control logic 225 comprises a plurality of comparators and logic gates. For example, the control logic 225 comprises a first comparator U8. The first comparator U8 receives the reference voltages, e.g., TOP_Ref and SW_Ref. The TOP_Ref is connected to the + pin and the SW_Ref is connected to the −pin. The 5V from the housekeeping circuit is input to VCC. Part No. LT1720 may be used as the first comparator U8. Capacitor C2 is also connected to the 5V and ground. As illustrated, the capacitor C2 has a capacitance of 0.1 µF. The first comparator U8 outputs a signal representing a difference of the two reference voltages, e.g., OutC1. OutC1 is supplied to a logic gate U13, which is a two input AND gate. The other input is a timing signal which is supplied by the run time duration 230. When both signals are high, the AND gate U13 outputs a high logic state. The output of the AND gate U13 is supplied to an NAND gate U6. Part No. 74HC08 may be used as the AND gate U13 and Part No. 74HC00 may be used as the NAND gate U6.

Therefore, the use of the timing signal with the AND gate U13, effectively controls when the AND gate U13 is able to output a high logic state and in turn controls when the NAND gate U6 outputs an appropriate logic signal to control the gate of the MOSFET M1. Since the gate driver U4 is an inverting gate driver, when the NAND gate U6 outputs a high logic state, MOSFET M1 is turned OFF. Only when the NAND gate U6 outputs a low logic state, e.g., 0, will the MOSFET M1 turn ON. Accordingly, only when the timing signal is a high logic state can the MOSFET M1 be turned ON. Advantageously, by controlling the timing signal, the timing that the MOSFET M1 is turned on can be controlled.

When the timing signal is high, the AND gate U13 may output a high logic state. The high logic state also representative of the difference between the two reference voltages (at the appropriate control timing). The logic state, e.g., high or low is integrated by an integrator. As illustrated, the integrator is a resistance and capacitor combination, e.g., R_Filter and C_Filter, respectively having a resistance of 2.2 kΩ and 0.5 nF. The integrator output OutF. The output OutF is supplied to two comparators U1 and U2. U1 and U2 are both two input comparators. One of the comparators U1 compares the OutF with CompRed (one voltage threshold) and one of the comparators U2 compares OutF with CompBlue (the other voltage threshold). CompRed is supplied to the −pin and CompBlue is supplied to the +pin. The comparators U1 and U2 may be the same as comparator U8. Also similar to comparator U8, comparators U1 and U2 are supplied with the 5V from the housekeeping circuit and respectively have capacitors C3 and C4. As illustrated, the capacitors C3 and C4 have a capacitance of 0.1 µF.

The outputs of the comparators U1 and U2 are supplied to a two input NOR gate U7. When the value of the integrated signal is between CompRed and CompBlue, the NOR gate U7 outputs a logic high state, otherwise, the NOR gate U7 outputs a logic low state. For example, when OutF is greater than CompRed, comparator U1 outputs a high logic state for RED otherwise, comparator U1 outputs a low logic state. Similarly, when CompBlue is greater than OutF, comparator U2 outputs a high logic state for Blue otherwise, comparator U2 outputs a low logic state. Thus, when OutF is between CompBlue and CompRed, both comparator outputs are low (Red and Blue) and accordingly, the output of the NOR gate U7 is a high logic state. Part No. 74HC02 may be used for the NOR gate U7.

When the output of the NOR gate U7 is a high logic state and the output of the AND gate U13 is also a high logic state, the output of the NAND gate U6 is low, which cause the gate driver U4 to turn the MOSFET M1 ON.

As described above, the output of the NAND gate U6 is supplied to the gate driver U4 (MOSFET Driver). Part No. EL7212C may be used as the gate driver U4. The EL7212C is a high speed inverting gate driver. The gate driver U4 is supplied with the 15V from the housekeeping circuit. Similar to other component, a capacitor C5 is connected thereto. As illustrated, the capacitor C5 has a capacitance of 0.1 µF.

The gate driver U4 outputs a Gate_Driver_Out signal to the switch 220.

As shown in FIGS. 2 and 3E, the drive circuit 35 has a switch 220. In an aspect of the disclosure, the switch 220 comprises a MOSFET M1. The gate of the MOSFET M1 is connected to EMI protection elements include an inductor L1 and a diode D1 and a resistor R_Gate. The inductor L1 may be a ferrite bead used to reduce noise at the gate of the MOSFET M1. The diode D1 is used around the ferrite bead to reduce a likelihood of retriggering of the MOSFET M1 due to oscillation from a Miller Effect capacitance and the inductance of the ferrite bead.

As illustrated, the resistor R_Gate has a resistance of 10Ω. The diode D1 may be a Schottky Barrier Rectifier. For example, Part No. 1N5819 may be used. The output of the gate driver U4 (MOSFET driver) is supplied to the gate (Gate_Driver_Out). In an aspect of the disclosure, the MOSFET M1 is a N-channel MOSFET. For example, Part No. SPA11N60C3 may be used. The MOSFET M1 is capable of high speed switching.

As shown in FIGS. 2 and 3G, the drive circuit 35 has a run time duration circuit 230. The run time duration circuit 230 is a 555 timing circuit. The duration circuit 230 comprises 555 IC U11. For example, Part No. NE555 may be used. 5V is supplied to the Vcc and a capacitor C12 is connected from Vcc to ground. 5V is also connected to a resistive divider (voltage divider). Similar to the logic threshold generation portion, the resistive divider have three resistors with one being variable. Resistor R6 and R8 are connected in series with a potentiometer RSet555. The set point of the potentiometer RSet555 determines the timing signal, e.g., Circuit_on. For example, the set point may be 0.25 with Rt=10K. However, this set point may be varied. Additionally, the initial set point is only described for descriptive purposes and other initial set points may be used as required. Changing the position of the wiper the potentiometer RSet555 changes the duty cycle of the timing signal Circuit_on. For example, as the position of the wiper increases the resistance between terminal L and the wiper, the duty cycle of the timing signal Circuit_on increases (MOSFET M1 is ON longer when the duty cycle is longer, thus the power supplied to the oscillating circuit 15 is more when the duty cycle is higher). Similarly, as the position of the wiper decreases the resistance between terminal L and the wiper, the duty cycle of the timing signal Circuit_on decrease (allowing the MOSFET M1 to be switched OFF longer where the power supplied to the oscillating circuit 15 is lower than when the duty cycle of the timing signal is higher).

The total cycle period for the timing signal is T where T is determined by the following equation:

$$T=0.8(R8+RSet555+R6)C11. \quad (1)$$

The time where the timing signal will be high is $T_{on}$, where $T_{on}$ is determined by the following equation:

$$T_{on}=0.8(R8+RSet555_{L \rightarrow Wiper})C11. \quad (2)$$

The time where the timing signal will be low us $T_{off}$, where $T_{off}$ is determined by the following equation:

$$T_{off}=0.8(RSet555_{H \rightarrow Wiper}+R6)C11. \quad (3)$$

The duty cycle is $T_{on}/T$.

In an aspect of the disclosure, the timing signal Circuit_on turns high when the voltage across capacitor C11 is less than ⅓Vcc and remains high until the voltage across the capacitor C11 reaches ⅔ Vcc. Thus, in an aspect of the disclosure, the internal control signal is ⅔ Vcc. The Discharge (pin) DIS allows the capacitor C11 to discharge to ground. The charging path for capacitor C11 (which is also the voltage of the threshold (THRS) and trigger (TRIG)) is formed from resistor R8, the resistance of terminal L to wiper, diode D6. The discharging path for the capacitor C11 is formed from resistor R6, diode D7 and resistance of terminal H to wiper), which forms a path to ground through the discharge terminal (DIS). The discharge (pin) DIS is pulled to ground internally when the output OUT pin is low; otherwise the terminal is floating allowing the capacitor C11 to charge.

The run time duration circuit 230 may also act as a general reset if the drive circuit 35 reaches a safe state of the MOSFET M1 latched OFF. The time signal, e.g., output of the run time duration circuit 230 is supplied to the AND gate U13. Therefore, the output of the AND gate U13 is directly controlled by the run time duration circuit 230 as needed.

As depicted, 5V is applied to the Reset RST pin to maintain the NE555 in an ON state verses OFF or in standby state.

FIGS. 2 and 3C depict the oscillating circuit 15 (Tank Circuit). The oscillating circuit 15 comprises inductor L_Tank and capacitor C_Tank. The inductance and capacitance determines the oscillating frequency. The inductance and capacitance values may be set as needed based on the application. As illustrated, the inductor L_Tank has an inductance of 2 µH and the capacitor C_Tank has a capacitance of 100 nF. Thus, the resonant frequency is 0.3559 Mhz. Additionally, the number of turns for the inductor L_Tank effects the emitted light. The description of the relationship between the number of turns and the effect on temperature of the porous graphite foam conductor 10 is described in U.S. Pat. No. 9,906,078 which is hereby incorporated by reference.

In an aspect of the disclosure, the oscillation has a frequency of between 25 kHz-1 MHz. In other aspects of the disclosure, the oscillation may have a frequency of at least 180 kHz. Additionally, in other aspects, the oscillation may have a frequency of less than 10 MHz. The oscillation may have a frequency of less than 2 MHz.

The oscillating circuit 15 oscillates over a period of time. Using a conventional drive circuit the oscillation dampens over time and will reach a level where the oscillating circuit 15 no longer oscillates. However, in accordance with aspects of the disclosure, the drive circuit 35 has a MOSFET M1 which is used to pull the voltage of SW to ground, e.g., a low state, to continuously drive the oscillation (when the MOSFET M1 is switched ON). By pulling the voltage of SW to ground, current flows from TOP (the first terminal) to SW (the second terminal) through the inductor L_Tank and capacitor C_Tank, effectively recharging the oscillation.

The timing that the MOSFET M1 is switched ON impacts the efficiency of the drive circuit 35 and reduces losses. Switching too early would release too much current from the capacitor C_Tank wasting energy and switching too late would work against the current in the inductor L_Tank. Therefore, in accordance with aspects of the disclosure, the timing for switching the MOSFET M1 ON is at least based on crossings of voltages TOP_Ref and SW_Ref to keep the oscillating circuit 15 with minimal losses. For example, in an aspect of the disclosure, the timing is when voltage SW reaches its minimum, which is also the time halfway between the crossing of when the voltage SW drops below voltage TOP and when voltage SW rises above voltage TOP.

As described above, TOP_ref is a scaled voltage of TOP (first terminal) and SW_ref is a scaled voltage of SW (second terminal). The scaling is to provide voltages into the first comparator U8 within its operating range. For example, the operating range for the first comparator U8 is less than 4.5V.

The first comparator U8 outputs a square waveform which is high when voltage SW_ref is less than voltage TOP_ref and which is low when voltage SW_ref is greater than TOP_ref (when the oscillating circuit 15 oscillates). In an aspect of the disclosure, the integrator (R_Filter and C_Filter, e.g., first order RC filter) modifies the square waveform into a triangle waveform having the same frequency. This enables a more accurate control of the circuit because of being able to compare voltage thresholds with a voltage level as opposed to a binary voltage output.

FIGS. 4A-4C depict waveforms of the drive circuit which were the result of SPICE simulation of the circuit. A transient analysis was used with a 500 ms stop time and a maximum timestep of 1 µs. FIG. 4A shows the current in the inductor (Tank Inductor Current), which is a function of the difference in voltage between voltage Top (first terminal) and voltage SW (second terminal). The right axis of the figure shows the values of current. FIG. 4A also shows the TOP voltage and SW voltage. The left axis in the figure shows the values in voltage. As seen in FIG. 4A, the TOP voltage is rectified to be about 168 VDC (may rise to slightly higher) whereas the SW voltage oscillates about the voltage of the TOP voltage.

The effect of switching MOSFET M1 ON, e.g., pulling SW to ground is shown by the inflection point on FIG. 4A, where there is a sharp decrease in the voltage SW. This timing matches with the gate voltage of the MOSFET M1 being higher than its threshold as shown in FIG. 4C.

FIG. 4B shows the output of the first comparator U8 where the square waveform is high when the SW_Ref drops below TOP_Ref and low vice versa. The integrator (resistor R_Filter and capacitor C_Filter) transforms the square waveform into a triangle waveform (shown in FIG. 4B) for adjustment of the duty cycle location and duration. In an aspect of the disclosure, the voltage thresholds (CompRed and CompBlue) govern the duty cycle and may be fixed. In other aspects of the disclosure, as will be discussed below, the voltage thresholds may be varied via a feedback network for the lighting system based on sensor output. The voltage thresholds (CompRed and CompBlue) are also shown in FIG. 4B. CompBlue is less than CompRed. In this simulation CompBlue was 3V and CompRed was 3.65V.

FIG. 4C shows the MOSFET driver's output (input to the gate). When the triangle wave's voltage (output of the integrator) is rising between the two voltage thresholds, the gate drive's output becomes high, in order to trigger the MOSFET M1 to act as a switch and reach a full on state rapidly. The drive circuit 35 prevents the triggering of the MOSFET M1 as the triangle wave's voltage is decreasing by using the NAND gate U6. This prevents the drive circuit 35 from retriggering which would cause incorrect operation of the oscillating circuit 15.

In an aspect of the disclosure, the drive circuit's power delivered to the inductor L_Tank can be controlled to less than 100 watts. Further reduction in power can be accomplished by controlling the gross off-on period of operation (using the run time duration circuit 230 because the load has a time constant of 50 seconds or longer depending on the mass of the porous graphite foam conductor 10 used.

A controller 40 used herein refers to any component or group of components that individually or collectively control the drive circuit 35 and LED lights 45. For example, the controller 40 may be a CPU, GPU, ASIC, analog circuit, or other functional logic, such as a FPGA, PAL or PLA. In the case of a CPU or GPU, the CPU or GPU may be executing instructions that are programmed in a computer readable storage device, such as a memory.

The memory may be, but not limited to, RAM, ROM and persistent storage. The memory is any piece of hardware that is capable of storing information, such as, for example without limitation, data, programs, instructions, program code, and/or other suitable information, either on a temporary basis and/or a permanent basis.

The controller 40 has a control set point for the output of the lighting system 1. For example, the control set point may be a set temperature or lighting amount. This control set point may be predetermined prior to installation. In other aspects of the disclosure, the control set point may be customized to a particular application and set after installation. In other aspects of the disclosure, the control set point may be periodically adjusted or changed as needed.

The controller 40 is configured to compare the control set point with a value received from sensors, e.g., sensor 25 and ambient sensor 30. In an aspect of the disclosure a proportional integral control (PI controller) may be used. In other aspects of the disclosure, a proportional integral derivative (PID controller) may be used. For example, the comparison of the control set point and the value detected generates an error signal. The error signal is used by the controller 40 to change at least one of the voltage thresholds (e.g., CompRed and/or CompBlue). For example, if a temperature sensor is used as sensor 25, and the temperature sensor detects that the heat generated by the porous graphite foam conductor 10 is higher than the control set point, then the error signal causes the controller 40 to adjust at least one of the voltage thresholds CompRed and/or CompBlue such that the MOSFET M1 is OFF for a longer period of time. In other words, the controller 40 adjusts one or both of the voltage thresholds such that they are closer to each other. Similarly, if the temperature sensor detects that the heat generated by the porous graphite foam conductor 10 is lower than the control set point, then the error signal causes the controller 40 to adjust at least one of the voltage thresholds CompRed and/or CompBlue such that the MOSFET M1 is ON for a longer period of time. In other words, the controller 40 adjusts one or both of the voltage thresholds such that they are further away from each other. For example, the controller 40 controls the potentiometer(s) RSetRed and/or RSetBlue to change the resistance, which in turn changes the values of the voltage thresholds CompRed or CompBlue.

In other aspects of the disclosure, instead of or in addition to adjusting the voltage thresholds, CompRed and/or CompBlue, the controller 40 may adjust the timing signal output from the run time duration circuit 230 (e.g., Circuit_on) based on the detected temperature or light. The adjustment to the timing signal is similar to the adjustment to the voltage thresholds. For example, if a temperature sensor is used as sensor 25, and the temperature sensor detects that the heat generated by the porous graphite foam conductor 10 is higher than the control set point, then the error signal causes the controller 40 to adjust the timing signal (Circuit On), such that the MOSFET M1 is OFF longer, e.g., lowers the duty cycle. This may also be executed by adjusting the resistance of the potentiometer RSet555. Similarly, if the temperature sensor detects that the heat generated by the porous graphite foam conductor 10 is lower than the control set point, then the error signal causes the controller 40 to adjust the timing signal (Circuit_on), such that the MOSFET M1 is ON for a longer period of time, e.g., raises the duty cycle.

The controller 40 may also adjust the voltage thresholds and the timing signal based on the detected output from the ambient sensor 30. For example, light from the surrounding environment may be used to adjust the control set point, e.g., the amount of output as a function of ambient conditions. The controller 40 automatically changes the control set point, e.g., up or down, to accommodate the ambient lighting (e.g., full daylight to nighttime operation). The adjustment of the set point would then cause the voltage threshold(s) and/or timing signal to be adjusted.

In addition to an ambient sensor 30 (such as a light sensor), other (exogenous) inputs may be accepted to the system 1 to modify its output emission thus accommodating local conditions. For example, an airport fog-detection system may provide a signal that indicates the need to increase output because of the presence of fog, smoke, or haze. The input may be implemented as a separate signal wire, a wireless communication, or over power-line carrier.

The wavelength of light that is generated by the system 1 may vary. For aviation uses wavelengths of between 1000-5000 nm are desirable. The optimal wavelength can in part be dictated by the detection device or camera that is being utilized. Wavelengths of between 2000-1200 nm are preferred for poor weather conditions. Wavelengths of up to 14 microns are possible.

The porous graphite foam conductor 10 may be derived from any suitable carbonaceous starting material and may be prepared by any suitable process. In an aspect of the disclosure, the carbon foam is prepared from a pitch selected from the group consisting of petroleum-derived mesophase pitch, petroleum derived isotropic pitch, coal-tar-derived mesophase pitch, synthetic mesophase pitch, and synthetic isotropic pitch. An example of a process of making the porous graphite foam conductor 10 is described in U.S. Pat. No. 9,906,078 which is incorporated herein by reference.

In aspects of the disclosure, the porous graphite foam conductor 10 may have difference shapes such as round, square, star, pentagon, hexagon or 12-point. Other shapes may also be used. The shape of the porous graphite foam conductor 10 may be determined based on desire emission output including wavelength and power.

The porous graphite foam conductor 10 may have a thermal conductivity of at least 40 W/mK. In other aspects of the disclosure, the porous graphite foam conductor 10 may have a thermal conductivity of between 40-100 W/mK. Also in other aspects of the disclosure, the porous graphite foam conductor 10 may have a thermal conductivity of at least 220 W/mK. The porous graphite foam conductor 10 may have a thermal conductivity of between 220-240 W/mK.

Further, in other aspects of the disclosure, the specific thermal conductivity of the porous graphite foam conductor 10 may be at least 109 W cm$^3$/mKg. In other aspects of the disclosure, the specific thermal conductivity of the porous graphite foam conductor 10 may be between 109-200 W cm$^3$/mKg. The porous graphite foam conductor 10 may have a specific thermal conductivity greater than four times that of copper. The porous graphite foam conductor 10 has been calculated to be over 95% efficient in the conversion of electricity to heat.

In an aspect of the disclosure, the porous graphite foam conductor 10 may have a porosity of at least 69%. In other aspects of the disclosure, the porous graphite foam conductor 10 may have a porosity of at least 85%. In other aspects of the disclosure, the porous graphite foam conductor 10 may have a porosity of between 69%-85%. The porosity may be as high as 89% and as low as 67%. The foam may have interconnected or isolated cells (pores).

The porous graphite foam conductor 10 heats faster than other carbon structures such as the blocks of graphite typically used as a susceptor, as well as carbon fibers. Typical graphite skin penetration is about 11 mm at about 180 kHz (for an 8000 micro-ohm-cm resistivity material), although this will vary with frequency and power. Skin depth is a strong function of frequency but not of power and varies with porosity and resistivity of the material. The total intensity is a function of power; however, the distribution of Eddy currents across the surface is not strongly related to power.

The wall thickness of a porous graphite foam conductor 10 may be between about 50-100 microns. The wall thickness will depend on the actual foam structure. The effective depth of penetration of the foam may therefore in one example be up to 11 mm using AC Induction heating.

Other aspects and properties of a porous graphite foam conductor 10 which may be used in the system 1 have been described in U.S. Pat. No. 9,906,078, which is incorporated herein by reference.

FIGS. 5-8 depict examples of the design of the inductor L_Tank. In an aspect of the disclosure, the induction coil(s) is designed to minimize the amount of electrical resistance because internal coil resistance causes heating according to the same relationship. A coil is selected to exhibit the lowest resistance possible at the working frequency to minimize the parasitic power dissipation and present itself as a specific inductance value so that the combination of its inductance the accompany capacitor resonate at the desired frequency, $$f = \frac{1}{2\pi\sqrt{LC}}. \quad (4)$$

Figure 6:
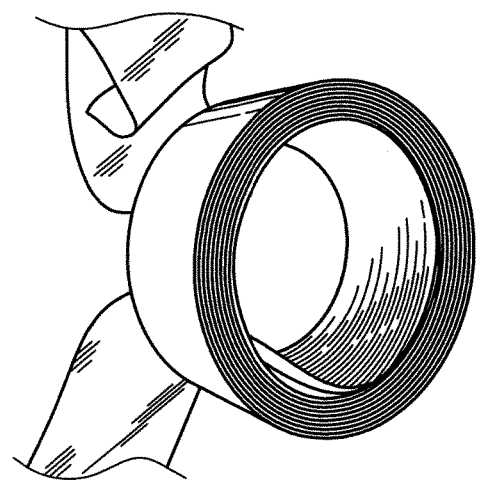
FIG. 6 is an illustration of another example of the inductor for the oscillating circuit in accordance with aspects of the disclosure.
Figure 5:
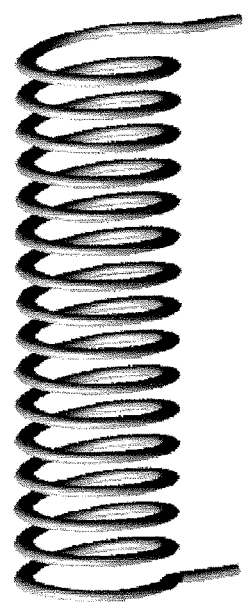
FIG. 5 is an illustration example of the inductor for the oscillating circuit in accordance with aspects of the disclosure.
Figure 7:
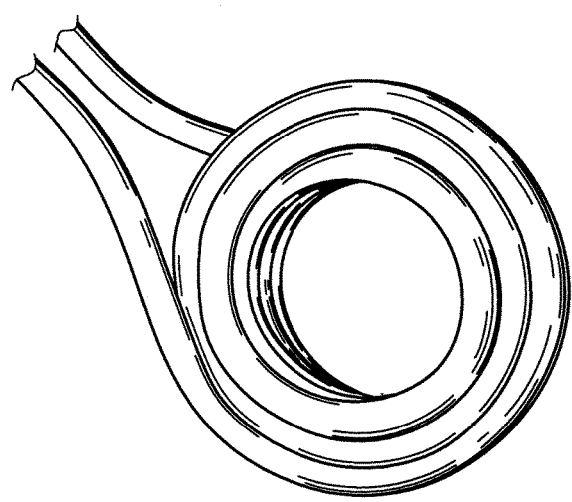
FIG. 7 is an illustration of another example of the inductor for the oscillating circuit in accordance with aspects of the disclosure.

In an aspect of the disclosure, the inductor L_Tank is a solenoid (shown in FIGS. 5-7). As depicted in FIG. 5, the solenoid, e.g., coil, is a single-layer with multiple turns. In other aspects of the disclosure, the solenoid may have multiple layers as shown in FIG. 6. The solenoid shown in FIG. 6 has an open bore. The sealed enclosure 5 may be inserted in the open bore.

Figure 8:
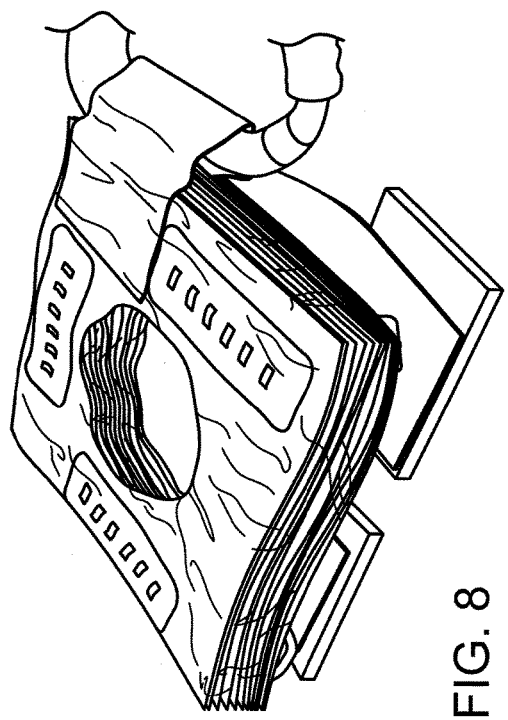
FIG. 8 is an illustration of another example of the inductor for the oscillating circuit in accordance with aspects of the disclosure.
Figure 12:
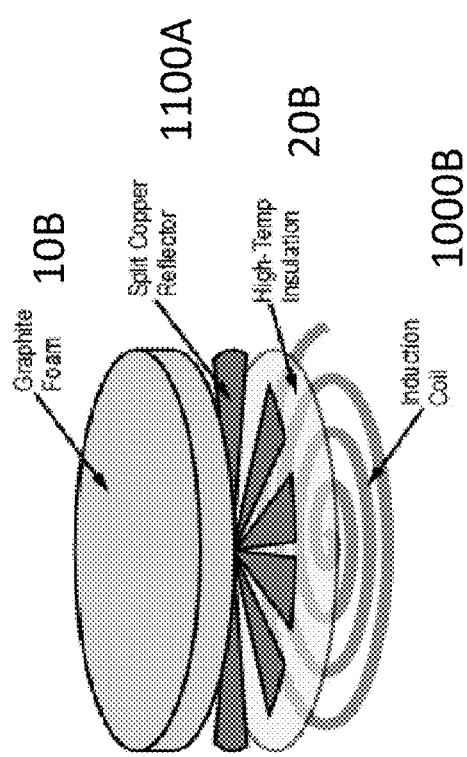
FIG. 12 is an exploded view of another example of an arrangement of a porous graphite foam conductor and an inductor in accordance with aspects of the disclosure where an insulator (high-temperature insulation) and split reflector are between the inductor and the foam.

In other aspects of the disclosure, the solenoid may have multiple layers and multiple turns as shown in FIG. 7. The solenoid shown in FIG. 7 also has an open bore. The sealed enclosure 5 may be inserted in the open bore. In another aspect of the disclosure, the coil may be a flat-wound coil as shown in FIG. 8, such as a Bitter coil (in FIG. 8, there are three temperature indicators on the top). In another aspect of the disclosure, the coil may be spiral wound with no bore, an example of which is shown in FIG. 12 as "induction coil 1000B".

Other examples of the design of the coils including number of turns, terminals, tap positions, coil size and diameter are described in U.S. Pat. No. 9,906,078, which is incorporated herein by reference.

In an aspect of the disclosure, the material used for the inductor L_Tank is selected to minimize the series resistance. For example, in an aspect of the disclosure, copper may be used. Copper has a high electrical conductance. In other aspects of the disclosure, aluminum may also be used. In others aspects of the disclosure, silver may be used. Silver has a higher conductivity than copper but is more expensive. The thickness of the copper in the coil is selected by accounting for the skin effect.

Figure 9:
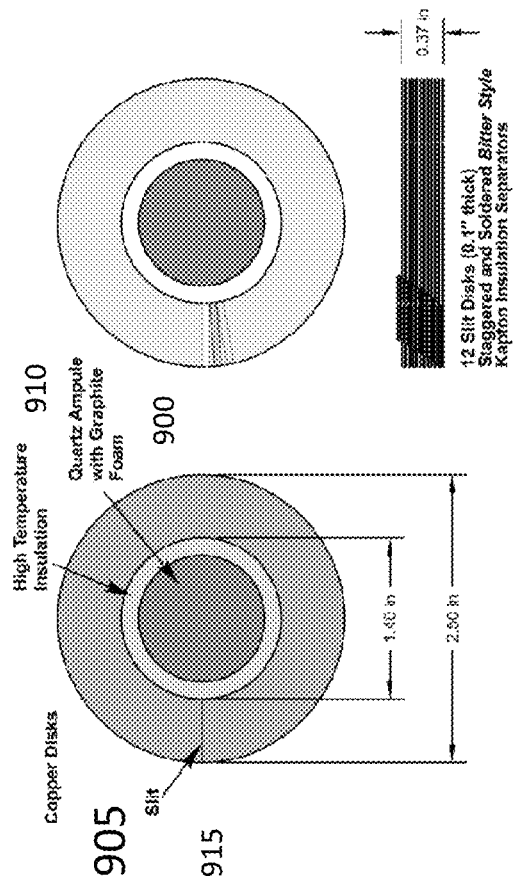
FIG. 9 are sectional views of an sealed enclosure having a porous graphite foam conductor and an inductor in accordance with aspects of the disclosure, the sealed enclosure is disposed in the bore of the inductor.

FIG. 9 depicts sectional views of a Quartz Ampule 900 (example of sealed enclosure 5) with the graphite form (example of the porous graphite foam conductor 10) and a copper disk (example of inductor L_Tank) in accordance with aspects of the disclosure. The sealed enclosure is disposed in the bore of the copper disks 905 such that the inductor surrounds the Quartz Ampule 900. A high temperature insulation 910 (example of insulator 20) is disposed between the Quartz Ampule 900 and the copper disks 905. As shown in FIG. 9, the copper disks have a diameter of 2.5 in. The diameter of the bore is 1.4 in. As depicted in FIG. 9, 12 disks are in the stack. Each disk has a slit 915. The slits 915 are the sites where adjacent disks (layers) are connected to each other, such that current flows into the adjacent layers. For example, disk 4 is connected to disk 3 and 5, where one part of the slit in disk 4 is connected to a part of the slit in disk 3 and the other part of the slit in disk 4 is connected to a part of the slit in disk 5. As depicted, for illustrative purposes only, the disks are arranged such that the slits 915 are staggered. However, other arrangements may be used. As depicted in FIG. 9, the stack has a height of 0.37 in.

Figure 10:
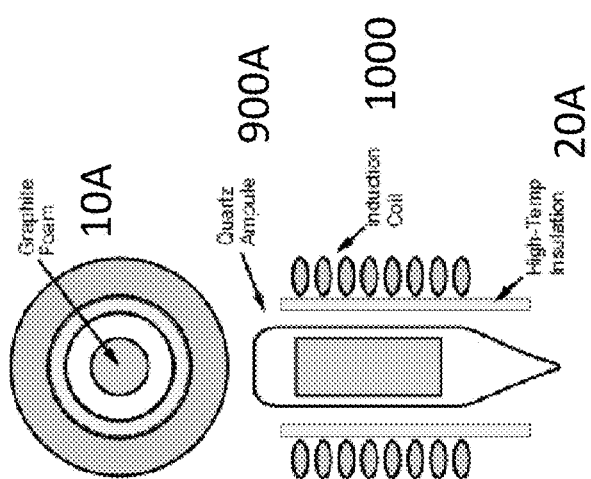
FIG. 10 are sectional views of another example of an arrangement of a sealed enclosure having a porous graphite foam conductor and an inductor in accordance with aspects of the disclosure where an insulator (high-temperature insulation) is between the inductor and sealed enclosure.

In an aspect of the disclosure, a solenoid type coil, e.g., induction coil 1000 (depicted in FIG. 10 (example of inductor L_Tank), is wrapped around Quartz Ampule 900A (example of sealed enclosure 5). FIG. 10 shows an example of the relationship between the Quartz Ampule 900A and induction coil 1000 in different sectional views. The high-temp insulation 20A is disposed between the induction coil 1000 and the quartz ampule 900A. As seen in FIG. 10, the high-temp insulation 20A surrounds the quartz ampule 900A. Both the high-temp insulation 20A and quartz ampule 900A are disposed in a gap of the induction coil 1000. The graphite foam 10A (example of porous graphite form conductor 10) is sealed within the quartz ampule 900A. In this configuration, light is emitted from the top (and bottom) of the quartz ampule 900A. The high-temp insulation 20A blocks the emission of light.

Figure 11:
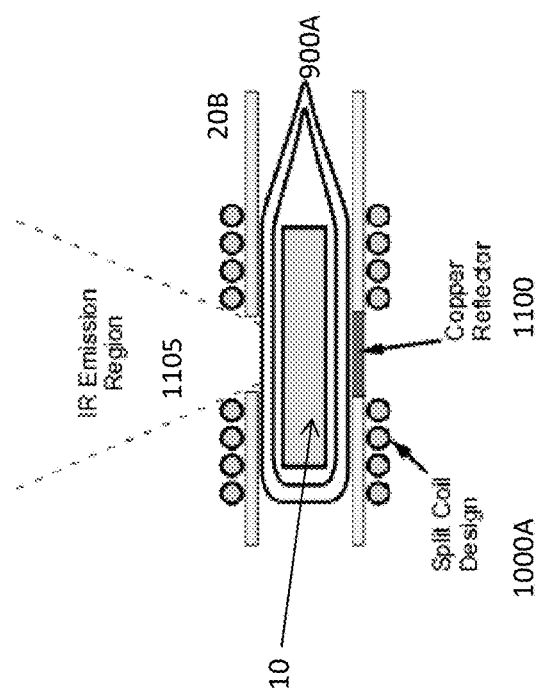
FIG. 11 is a sectional view of another example of an arrangement of a sealed enclosure having a porous graphite foam conductor and an inductor in accordance with aspects of the disclosure where the inductor is a split coil design and a reflector is used to focus the emitted light toward an gap in the insulator.

In another aspect of the disclosure, a solenoid type coil, having a spilt coil design 1000A may be used (another example inductor L_Tank) as depicted in FIG. 11. The split coil design 1000A is wrapped around the Quartz Ampule 900A (example of sealed enclosure 5). The split coil design 1000A effectively has two portions separated from each other by a space or gap. An insulator 20B is disposed between the split coil design 1000A and the Quartz Ampule 900A. In this aspect of the disclosure, the insulator 20B is only disposed in areas facing the split coil design 1000A. Thus, there is a window or gap in the insulator 20B in the same position as the gap or space in the split coil design that separates the turns. In accordance with aspects of the disclosure, a copper reflector 1100 is disposed in a portion of the gap. FIG. 11 is a sectional view. The copper reflector may extend along a portion of the circumference of the gap or window in the insulator 20B. For example, the copper reflector 1100 may extend 180°, e.g., half a circle. Opposing the copper reflector on the opposite side with respect to the Quartz Ampule 900A, is a window or gap within the insulator 20B (without the copper reflector). This window or gap forms a light emission region (e.g., IR emission region 1105). Light emitted by the porous graphite foam conductor 10 is reflected by the copper reflector 1100 toward the gap or space 1105, e.g., toward the IR emission region, which is one of the regions where the light is emitted from in this aspect of the disclosure. In other aspects of the disclosure, copper reflectors (e.g., 1100), may be added to the ends (in FIG. 11, left/right direction), to prevent light from being emitted, whereby the light is channeled to the IR Emission Region 1105.

In another aspect of the disclosure, a spiral coil (induction coil 1000B) may be used (another example of inductor L_Tank) as shown in FIG. 12. As shown in FIG. 12, the graphite foam 10B (example of porous graphite foam conductor 10) is shaped as a disk. As oriented in the figure, the graphite form 10B is disposed above the induction coil 1000B. However, other orientations are possible. Between the graphite foam 10B and the induction coil 1000B, there are layers for a split copper reflector 1100A and high-temp insulation 20B. The copper reflector has gaps configured to prevent eddy currents from making a circular path. The number of gaps and dimensions of the same are determined by balancing the amount of reflection needed and preventing the eddy currents from circulating. Additionally, in an aspect of the disclosure, the number and dimension of the gap may be based on the frequency and power. Although not shown in FIG. 12, at least the graphite foam 10B is housed in a sealed enclosure as described above. In an aspect of the disclosure, the split copper reflector 1100A reflects a light emitted in its direction back into the foam 10B. The housing is designed to allow light to be emitted from the top (in this depicted orientation).

In other aspects of the disclosure, the inductor L_Tank may be disposed inside of the graphite foam and be surrounded thereby.

Other examples of the relation between the inductor L_Tank and the sealed enclosure 5 with the porous graphite foam conductor 10 are described in U.S. Pat. No. 9,906,078, which is incorporated herein by reference.

The lighting system 1 with drive circuit 35 disclosed herein has many application, including, but not limited to, commercial office buildings, security, warehouses, factories, garages, parking lots, street lights, municipal buildings, government facilities, airport terminals, control towers, heliports and heliport facilities and installations, airport cargo bays, fire and rescue buildings, airfields, runways and taxiways, hospitals, oil rig platforms and helipads, obstruction lighting for towers, buildings and high terrain, airlines, corporate aircraft, helicopters, general aviation, Department of Defense, security, intelligence, customs, surveillance and reconnaissance, unmanned aircraft vehicles, and drones. In airports the uses include runway edge lights, ramp lights, instrument lights, runway center line, runway perimeter, and others. Maritime uses include buoys, navigation markers, and ships lighting, search & rescue, bridges and planning, digital navigation charts, port and harbor piloting, coastal surveillance UAVs, offshore oilrig safety and operations, and DOD "pinpoint positioning" requirements.

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device, may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electromagnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

The terms "Controller" as may be used in the present disclosure may include a variety of combinations of fixed and/or portable computer hardware, software, peripherals, and storage devices. The "Controller" may include a plurality of individual components that are networked or otherwise linked to perform collaboratively, or may include one or more stand-alone components. The hardware and software components of the "Controller", of the present disclosure may include and may be included within fixed and portable devices such as desktop, laptop, and/or server, and network of servers (cloud).

The terminology used herein is for the purpose of describing particular aspects only and is not intended to be limiting the scope of the disclosure and is not intended to be exhaustive. Many modifications and variations will be apparent to those of ordinary skill in the art without departing from the scope and spirit of the disclosure.

What is claimed is:

1. A system for producing light comprising:
   a sealed enclosure surrounding a porous graphite foam conductor;
   an oscillating circuit comprising a first inductor and a first capacitor, the first inductor having a first terminal and a second terminal, the oscillating circuit configured to generate an electromagnetic field, the porous graphite foam conductor when exposed to the electromagnetic field conducting an induced electric current, the induced electric current heating the porous graphite foam conductor to produce light;
   a drive circuit couplable to an AC power source and the oscillating circuit, the drive circuit configured to regulate an amount of light produced by the porous graphite foam conductor, the drive circuit comprising:
      a full wave rectifier couplable to the AC power source configured to convert AC power from the AC power source into DC power; and a MOSFET, the drain of the MOSFET being coupled to the second terminal, the source coupled to a ground and the gate being coupled to a gate drive circuit, the MOSFET being turned on when an integrated signal representative of a difference between a voltage proportional to the first terminal and a voltage proportional to the second terminal is between a first voltage threshold and a second voltage threshold and based on a timing signal.

2. The system of claim 1, further comprising a light sensor configured to detect the light produced by the porous graphite foam conductor or a temperature sensor configured to detect the temperature of the porous graphite foam conductor.

3. The system of claim 2, wherein at least one the first voltage threshold and the second voltage threshold are variable to increase or decrease the light produced based on the detected light by the light sensor or the temperature detected by the temperature sensor.

4. The system of claim 3, wherein the first voltage threshold and the second voltage threshold are respectively varied by adjusting a respective potentiometer.

5. The system of claim 2, wherein the timing signal is variable to increase or decrease the light produced based on the detected light by the light sensor or the temperature detected by the temperature sensor.

6. The system of claim 5, further comprising a 555 timing circuit configured to output the timing signal based on input to a trigger pin and a threshold pin, the input to the trigger pin and the threshold pin being variable using a potentiometer.

7. The system of claim 1, further comprising an insulator at least partially surrounding the sealed enclosure, wherein the insulator is disposed between the sealed enclosure and the first inductor.

8. The system of claim 7, wherein the insulator has a window and the light is emitted via the window.

9. The system of claim 8, further comprising a reflector disposed opposing the window where the light is emitted.

10. The system of claim 1, wherein the first inductor is a spiral coil, and wherein the system further comprises an insulator disposed between the porous graphite foam conductor and the spiral coil and a reflector disposed between the porous graphite foam conductor and the spiral coil, the reflector comprising a plurality of reflective portions separated by gaps.

11. The system of claim 1, wherein at least a portion of the light is emitted in the infrared spectrum.

12. The system of claim 1, wherein the drive circuit further comprises a decoupling device between the full wave rectifier and the oscillating circuit.

13. The system of claim 12, wherein the decoupling device is a diode coupled in series with a second inductor, where the second inductor is coupled to the first terminal.

14. The system of claim 13, further comprising a second capacitor having a first plate and a second plate, the first plate being coupled to the second inductor and the first terminal of the inductor and the second plate being coupled to the ground.

15. The system of claim 13, further comprising:
a first resistor coupled to a second resistor in series, the first resistor coupled to the first terminal, wherein the voltage proportional to the first terminal is a voltage between the first resistor and the second resistor; and
a third resistor coupled to a fourth resistor in series, the third resistor coupled to the second terminal, wherein the voltage proportional to the second terminal is a voltage between the third resistor and the fourth resistor.

16. The system of claim 15, wherein the first resistor has a different resistance than the third resistor.

17. The system of claim 1, wherein the electromagnetic field is controllable to a power less than 100 W.

18. The system of claim 1, further comprising an ambient light sensor configured to sense light in an environment where the system is deployed and wherein at least one of the first voltage threshold and the second voltage threshold are variable to increase or decrease the light produced based on the detected light by the ambient light sensor.

19. The system of claim 18, wherein the timing signal is variable to increase or decrease the light produced based on the detected light by the ambient light sensor.

20. The system of claim 1, wherein the sealed enclosure further comprises a noble gas.

* * * * *